INVENTOR.
Reinhardt Michalke
BY Michael S. Striker
Attorney

United States Patent Office 3,421,314
Patented Jan. 14, 1969

3,421,314
AIR-FUEL RATIO CONTROL SYSTEM
Reinhard Michalke, Kiel-Pries, Germany, assignor to
Maschinenfabrik Buckau R. Wolf Aktiengesellschaft,
Grevenbroich, Germany
Filed Mar. 21, 1966, Ser. No. 536,158
Claims priority, application Germany, Mar. 20, 1965,
M 64,597
U.S. Cl. 60—13                                5 Claims
Int. Cl. F02b *41/10;* F01k *23/14;* F02b *33/00*

ABSTRACT OF THE DISCLOSURE

A blow off valve in an air conduit through which air is charged by a blower into a combustion engine, is automatically controlled in accordance with the operational conditions of the engine to blow off air so that the fuel-air ratio is maintained substantially constant at sudden load changes.

---

The present invention relates to an air-fuel ratio control system for a combustion engine, and more particularly to an apparatus and method for varying the amount of air supplied by an exhaust-driven blower-charger to a four stroke Otto combustion engine in accordance with the operational conditions of the engine.

It is known that the output of the combustion engine can be substantially increased if the energy of the exhaust gases is used to produce compressed air by means of a blower so that the air necessary for combustion is charged at high pressure into the cylinder together with the fuel gas. The regulating of a supercharged four stroke Otto motor causes difficulties, particularly at reduced or partial loads, since the exhaust-driven blower compresses more air than is required for a reduced load due to the available energy of the exhaust gases and to the kinetic energy of the rotary parts which maintain a high number of revolutions of the blower.

Under such operational conditions, there is a tendency for the blower to "pump" and to cause pressure pulsation. Such a pressure pulsation may become great enough to produce a reduced pressure in the exhaust pipe which may in some cases leave the exhaust turbine driving the blower without any driving power so that the blower stops and stalls the engine.

Several solutions of this problem have been proposed. It is known to design the blower-charger so that it operates in its stable region under a partial load. However, such an arrangement has the disadvantage that the blower operates at the very low efficiency at normal or high loads, and that the maximum charging pressure is low. Furthermore, it cannot be avoided that at very sudden load changes, the undesired "pumping" occurs so that momentarily no combustible fuel-air mixture is available for the engine. Consequently, this construction is only suitable for combustion engines whose load is substantially constant.

It is also known to provide a blow-off valve operated under the control of a governor driven by the combustion engine and to operate the blow-off valve in such a manner that for each position of the governor, the blow-off valve is opened to a corresponding extent. The cross section of the discharge opening of the blow-off valve depends only on the positions of the governor. For example, at a 20% load, the cross section of the blow-off valve is always the same, irrespective of whether the combustion engine has been operated for a long time at this load, or whether the governor indicates a momentary drop of the load. Particularly in the latter case, more air is supplied by the blower, because the rotor of the exhaust turbine driving the blower is operated at full speed by the exhaust gases, so that more air is compressed and charged into the combustion engine than is required by the momentarily reduced load of the engine. The blow-off cross section of the valve permits the escape of superfluous air during normal operation of the combustion engine, but does not permit the discharge of such an amount of air which is required when the blower is operated at full speed during a sudden drop of the load. Under such conditions, "pumping" of the blower occurs, and the combustion engine becomes incapable of producing a torque for sustaining the reduced load. Another disadvantage of this construction is that the inertia of the supercharged combustion engine is increased upon rapid increase of the load due to the fact that a part of the combustion air supplied by the blower escapes through the open blow-off valve. Consequently, combustion engines provided with air-fuel ratio control systems according to this construction can only be used for certain purposes which do not cause wide variations of the operational conditions.

It is one object of the invention to overcome the disadvantages of known control systems for the charging of a combustion engine with air, and to provide an air-fuel ratio control system of simple construction which reliably operates under all operational conditions.

Another object of the invention is to provide an air-fuel ratio control system for a combustion engine in which a part of the compressed air supplied by a blower to a combustion engine, is discharged depending not only on the rotary speed of the combustion engine or on the load of the same, but also on the pressure of the air compressed by the blower.

Another object of the invention is to vary the amount of compressed air charged into a combustion engine in accordance with varying load conditions so as to maintain a fuel-air ratio favorable to the momentarily prevailing operational condition.

In accordance with the invention, a blow-off valve is provided behind the exhaust-driven blower. The blow-off valve means is moved so that its discharge cross section varies, and the discharge cross section is determined by the respective required pressure of the charged air. The required air pressure is determined by the position of a governor responding to the number of revolutions of the combustion engine. Such a control of the blow-off valve has the advantage that at a sudden reduction of the load of the combustion engine, the air supply of the engine is not disturbed by a "pumping" action of the blower charger. At a sudden drop of the load, the pressure required for opening the blow-off valve is reduced so that the air pressure, which is momentarily too high, is reduced by blowing-off. The blown-off air constitutes an additional load of the exhaust-driven blower, particularly if the blow-off valve is partly opened. The blown-off amount of air is increased, so that the blower always operates in a stable region. At a sudden increase of the load, the blow-off valve is momentarily closed, so that all the air compressed by the blower is available for the engine as charged combustion air.

One embodiment of the invention comprises a combustion engine; fuel supply means connected with the combustion engine, and preferably with a mixer valve of the same; blower means preferably driven by a turbine operated by the exhaust gases of the combustion engine, and having an air conduit connected with the combustion engine, or more particularly with a mixer valve, for supplying air under pressure to the combustion engine; blow-off valve means connected with the air conduit and having a normal position and a blow-off position, and being biased by the pressure in the air conduit to move from the normal position to the blow-off position; and control means for the blow-off valve responsive to variations of the operational conditions of the combustion engine, particularly load and speed variations, to hold the blow-off valve in the normal position during normal operation of the combustion engine, but being responsive to varying operational conditions to permit movement of the blow-off valve means to the blow-off position in which such an amount of air compressed by the blower means is blown-off into the atmosphere that the fuel-air ratio is in accordance with the prevailing operational condition of the combustion engine.

The blow-off valve may be partly open in the normal condition, and is controlled by a speed-responsive governor to move to a wider open position when the load of the combustion engine drops, and to move to a closed position when the load of the combustion engine increases above the normal load.

However, it is also possible to maintain the blow-off valve closed during normal operation of the combustion engine, and to control the blow-off valve by a speed-responsive governor to open only when the load drops so that the superfluous air is discharged into the atmosphere.

Preferably, the speed-responsive governor is not directly connected with the movable valve member of the blow-off valve, but actuates a servo motor which then displaces the movable valve member of the blow-off valve. Mechanical, hydraulic or pneumatic servo motors may be used whose control valve is operated over a linkage by the speed-responsive governor. In another embodiment of the invention, the cylinder of the servo motor is connected by a conduit with a mixer valve, so that the servo motor is controlled by the pressure in the space between the mixing pipe and the cylinder.

In one embodiment of the invention, the governor actuates a control valve which controls the flow of pressure oil into and out of the cylinder of the servo motor. In another embodiment of the invention, a servo motor is operated by air supplied through a conduit from the air conduit of the blower. The pressure in the cylinder of the servo motor is varied by permitting the discharge of air from the same under the control of a governor.

From the above description of several embodiments of the invention, it will become apparent that the present invention also relates to a method of charging a combustion engine with air, the method comprising the steps of supplying to the combustion engine pressure air from a blower, and fuel; blowing-off a part of the pressure air through a blow-off valve biased by the pressure air to move to an open position; and controlling the blow-off valve in accordance with varying operational conditions of the combustion engine whereby the amount of blown-off air varies under different operational conditions so as to be favorable to the momentary prevailing operational condition.

The novel features which are considered as characteristic for the invention are set forth in particular in the appended claims. The invention itself, however, both as to its construction and is its method of operation, together with additional objects and advantages thereof, will be best understood from the following description of specific embodiments when read in connection with the accompanying drawings, in which:

Figure 4:
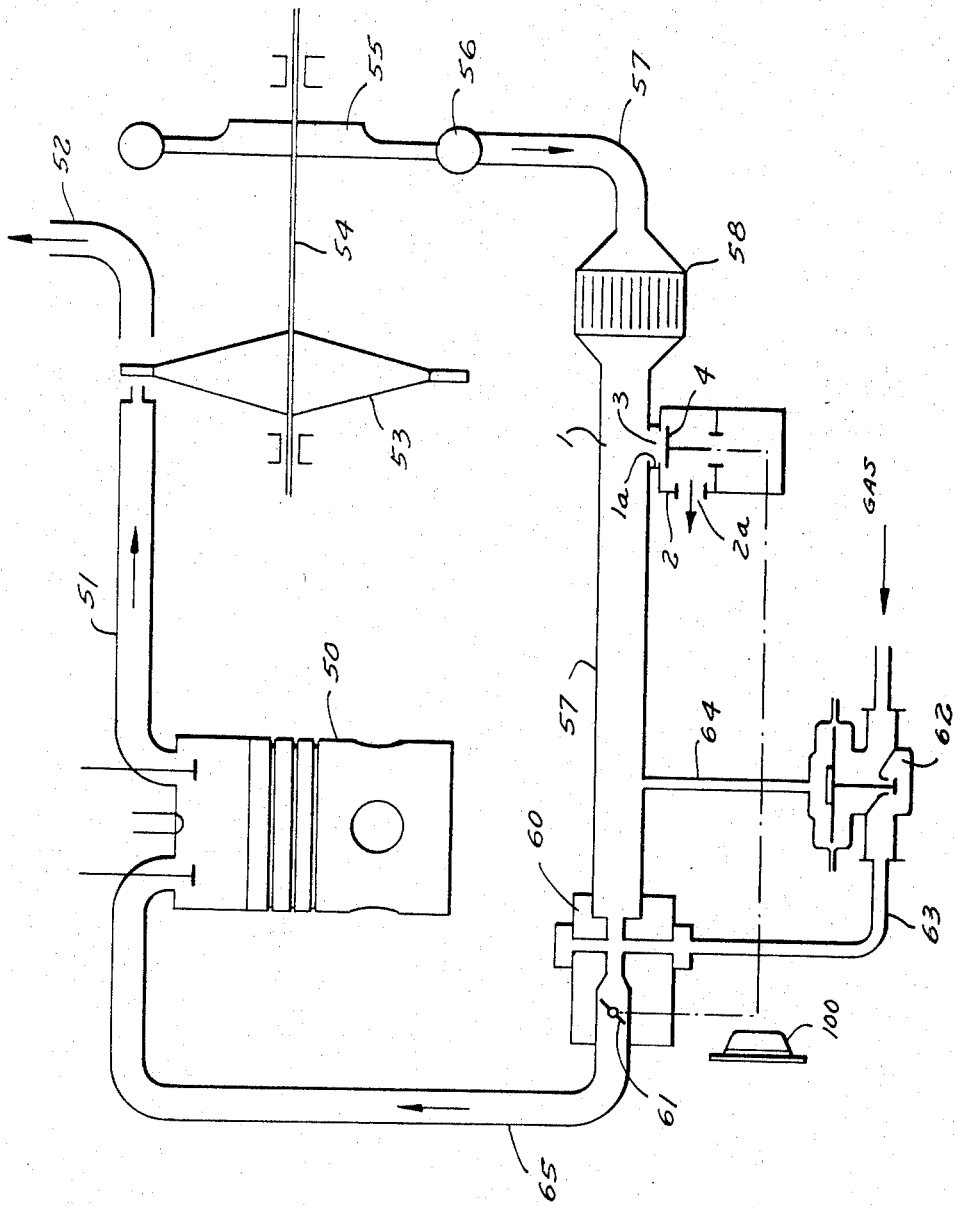
FIG. 4 is a schematic diagram illustrating an air-fuel ratio control system for a combustion engine incorporating a regulating device according to the invention.

Referring now to the drawings, and more particularly to FIG. 4, a combustion engine, preferably a four stroke Otto motor 50, has an inlet pipe 65 for a fuel-air mixture, and an exhaust pipe 51 terminating in an exhaust 52 communicating with the atmosphere. A turbine 53 has vanes located in exhaust pipe 51, 52 so that the turbine and shaft 54 are rotated. A blower 55 has a rotor secured to shaft 54 so that pressure air is blown into the casing 56 and discharged into connecting conduit 57 provided with a cooling heat exchanger 58 and connected to one inlet of a mixer valve 60 to whose other inlet a fuel pipe 63 supplies a gaseous fuel at a certain pressure determined by a pressure regulator 62 which communicates through a pipe 64 with connecting air conduit 57.

Figure 1:
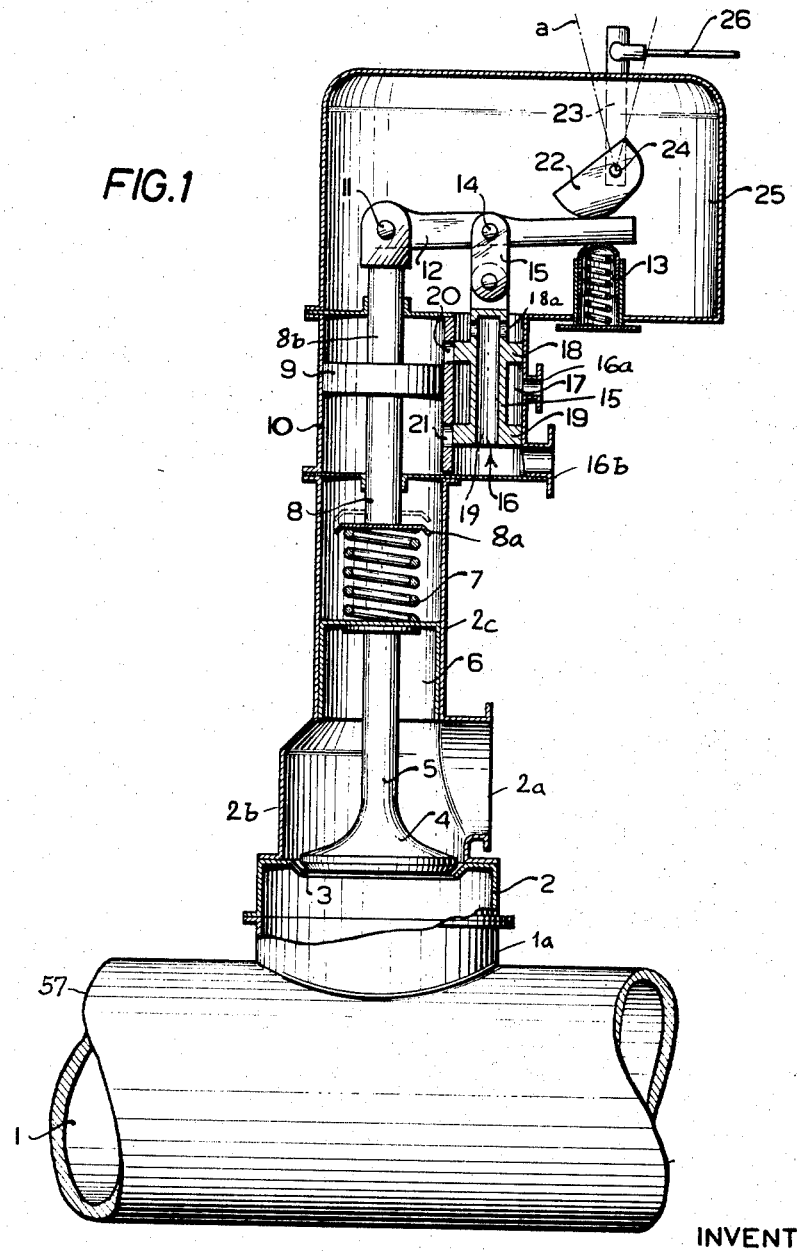
FIG. 1 is a fragmentary sectional view illustrating a regulating device according to a first embodiment of the invention.
Figure 2:
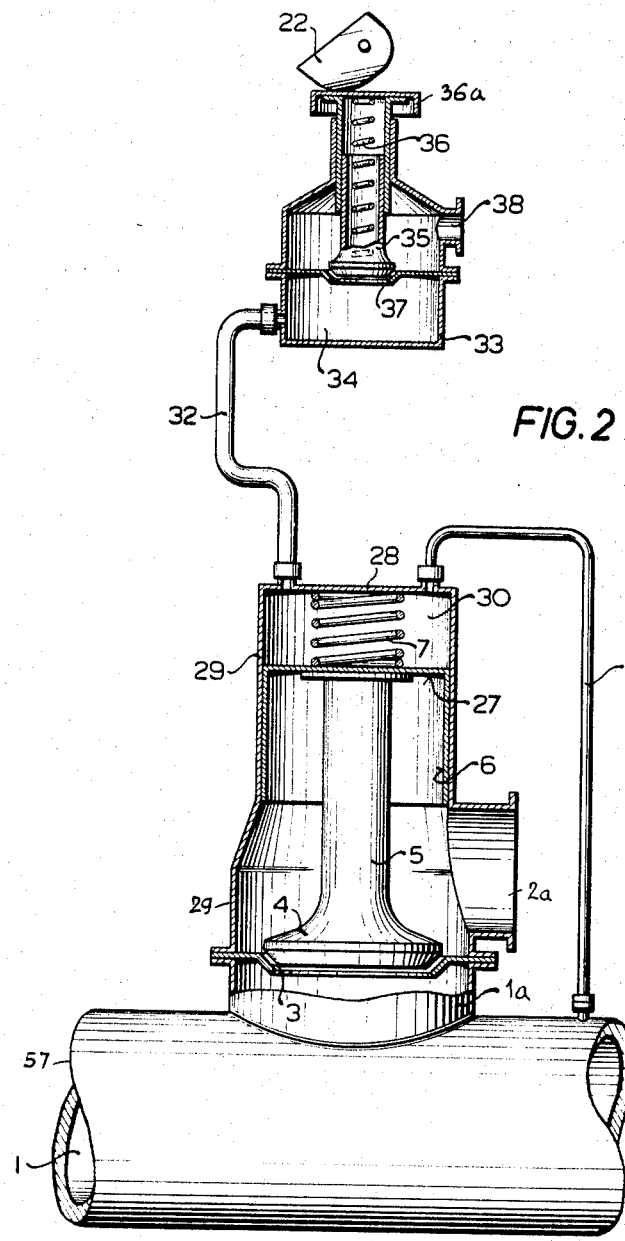
FIG. 2 is a fragmentary sectional view illustrating a regulating device according to a second embodiment of the invention.
Figure 3:
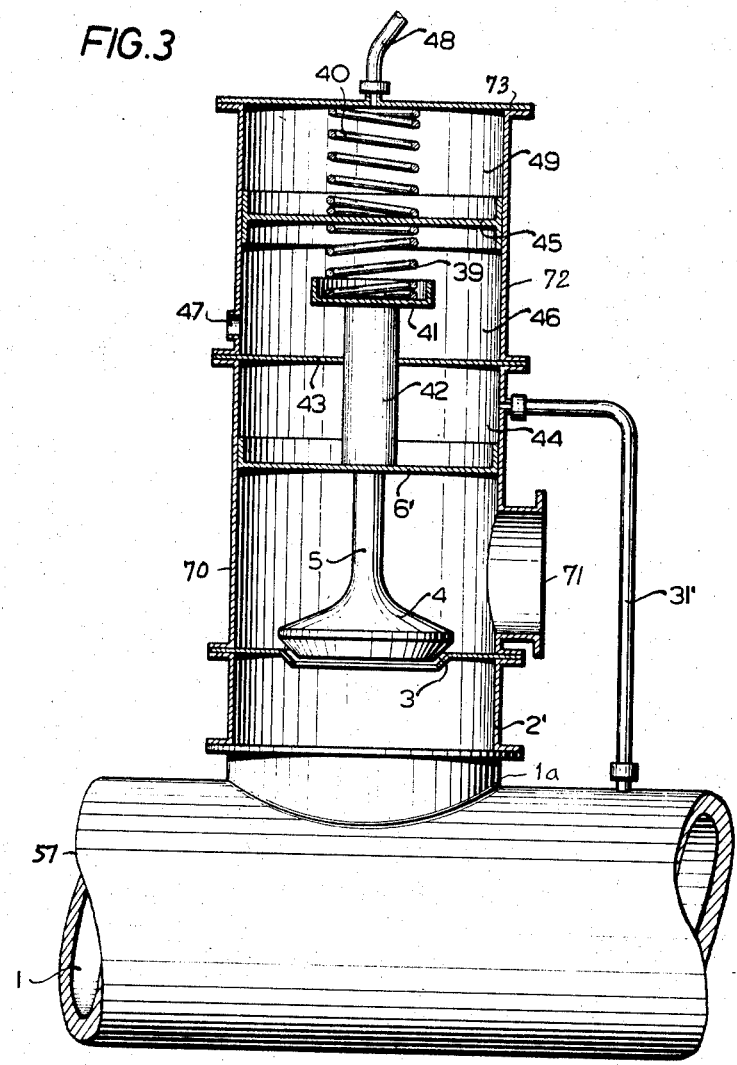
FIG. 3 is a regulating device according to a third embodiment of the invention.

Connecting air conduit 57 has a portion 1 provided with a flange 1a to which one of the regulating devices shown in FIGS. 1, 2 and 3 is secured. As schematically shown in FIG. 4, the regulating device has a valve seat 3, and a valve member 4.

A governor 100 is responsive to the rotary speed and the number of revolutions of the crankshaft, not shown, of combustion engine 50, and controls the position of the butterfly valve member 61 of mixer valve means 60.

In accordance with the invention, the governor is also operatively connected with valve member 4, which is biased by the pressure in conduit 57. In accordance with the operational conditions of the combustion engine, the governor 100 effects closing of the valve, or wider opening of the valve so that the amount of air blown-off through opening 2a varies in accordance with the operational conditions of the engine 50 so as to maintain the air-fuel ratio substantially constant at all times. When valve 4 is open, air is discharged through opening 2a into the atmosphere so that a lesser amount of air reaches the mixer valve 60 and combustion engine 50 then when valve 4 is closed or only partly open. Consequently, the ratio between the amount of air supplied through conduits 57 and 65, and the gaseous fuel supplied through conduits 63 and 65 only slightly varies with the operational conditions of combustion engine 50, and more particularly with a varying load causing variations in the number of revolutions of the output shaft of engine 50.

Referring now to the embodiment of FIG. 1, the regulating means has a pipe portion 2 secured to a pipe socket 1a of air conduit portion 1. Pipe portion 2 has a valve seat 3 normally closed by a valve member 4, 5 located in a housing 2b having an openings 2a communicating with the atmosphere and being secured to pipe portion 2. A tubular portion 2c of the casing slidably guides a piston-shaped slide 6 secured to a flange at the upper end of valve stem 5. A spring 7 rests on slide 6, and abuts a dish-shaped abutment 8a on a piston rod 8 carrying a piston 9 located in a cylinder 10 which has ports 20 and 21 communicating with the interior 17 of the casing of a valve 16 which has an inlet for pressure oil 16a and an outlet 16b. A slide valve member 15 has a pair of control flanges 18 and 19 cooperating with ports 20 and 21, and a pair of openings 18a communicating with a longitudinal duct 19a in the slide valve member 15.

A lug on slide valve member 15 is articulated to a link 15a which is connected by a pivot 14 with a lever 12 mounted on the upper portion 8a of piston rod 8 for angular movement. The free end of lever 12 abuts a spring-loaded stop 13 mounted on a housing 25 and tending to turn lever 12 in counterclockwise direction.

An angular double-armed lever is mounted for turning movement on a pivot pin 24 secured to housing 25 and has a cam-shaped first arm 22 abutting the free end of lever 12, and a second arm 23 connected by a connecting rod 26 with the governor 100, which controls the butterfly valve 61 of the mixer valve 60 in accordance with the load and the number of revolutions of the output shaft of the combustion engine 50, as explained with reference to FIG. 4.

The air pressure in conduit 57, 1 and pipe portion 2 acts on valve 4 to raise the same, but under normal operational conditions of the engine when control means 22 to 26, 100 are in the position of FIG. 1, the pressure of spring 7 balances the air pressure so that valve 4 is partly opened permitting a small amount of air to be blown-off through opening 2a. Cam arm 22 holds lever 12 in a position in which flanges 18, 19 of slide valve member 15 close ports 20 and 21 so that piston 9 exerts no force on the valve member 4 and is blocked since no oil can escape through the closed ports 20 and 21.

When governor 100 responds to the increase of the speed of the output shaft of engine 50 which may be due to a drop of the load, arm 23 is angularly displaced and assumes the position a indicated by a chain line. Cam arm 22 displaces lever 12 while compressing the resilient stop 13 so that valve member 15 is downwardly shifted to a position in which flange 19 is located below port 21 so that pressure fluid supplied to inlet 17 flows through the annular chamber surrounding the center portion of slide valve 15 into port 21 and the lower chamber of cylinder 10 so that piston 9 is upwardly moved while oil from the upper cylinder chamber flows out of port 20, through openings 18a, and central duct 19a to outlet 16b. Since piston rod 8 and dish-shaped abutment 8a move upward, spring 7 expands and the pressure on the piston-shaped slide 6 is reduced so that the air pressure prevailing in air conduit 57, 1 and in pipe portion 2 is sufficient to raise valve member 4 for opening or opening wider the passage for the discharge of air permitting a greater amount of air to escape from conduit 57, 1 into housing 2b and from there through opening 2a into the atmosphere.

As explained with reference to FIG. 4, since a portion of the air supplied to the mixer valve 60 is blown-off, while the amount of fuel is maintained, the congruent ratio between the gaseous fuel and the air supplied to combustion engine 50 is maintained while its volume is varied in such a manner that the fuel-air mixture supplied to the engine is most favorable for the momentary operational condition of the engine which caused a variation of the speed of the output shaft of the engine, and consequently the actuation of the regulating device by the control means 22 to 26, 100.

If due to a reduced speed of the combustion engine, the control means moves in the opposite direction, and the resilient means 13 turns lever 12 in counterclockwise direction, the slide valve is shifted upward, and servo motors 9, 10, 20, 21 is actuated to compress spring 7 so that the air pressure acting on valve member 4 is overcome, and valve member 4 closes valve seat 3 preventing the escape of air so that more air is supplied through conduit 57 to the combustion engine.

In the embodiment of FIG. 2, valve member 4, 6, is secured to a piston-shaped slide 6 and is movable between a normal partly open position shown in FIG. 2, a closed position, and a wider open position, as described with reference to FIG. 1. A housing 29 has a cylindrical portion 29a in which slide 6 is guided, and a discharge opening 2a through which air from conduit 57, 1 is blown-off when valve member 4 moves away from valve seat 3. The cylinder portion 29a of housing 29 is closed by an end member 28, and forms a cylinder chamber 30 with the end plate 27 of slide 6. Spring 7 is located in chamber 30 and urges the valve member 4, 5 into engagement with valve seat 3. An inlet conduit 31 of comparatively small cross section connects conduit 57, 1 with cylinder chamber 30. An outlet conduit 32, which has a greater cross section than conduit 31, connects cylinder chamber 30 with the interior 34 of a control chamber 33 which has a valve seat 37. A valve member 35 cooperates with valve seat 37 and has a portion guided in a corresponding cylindrical portion 36b of an abutment member 36a. Cam arm 22 of control means 22 to 26, 100, as described with reference to FIG. 1, holds abutment member 36a in the illustrated position when governor 100 responds to the normal operational conditions of engine 50. Air continuously escapes from chamber 30 through outlet conduit 32, chamber 34, valve seat 37 and discharge opening 38, but is replenished in chamber 30 by air from conduit 57, 1 entering through inlet conduit 31.

The combined pressure of the air in cylinder chamber 30 and of spring 7 is just sufficient to hold piston-shaped slide 6 and valve member 4, 5 in the partly open position shown in FIG. 2 against the pressure of the air in conduit 57, 1 which acts on the end face of valve member 4. Consequently, during normal operational conditions, a small amount of air will be blown-off through valve seat 3, housing 29 and opening 2a.

If the load on the engine 50 drops, and the number of revolutions of the output shaft of the engine is increased, control means 22 to 26, 100 respond, and cam arm 22 is turned a small angle in clockwise direction so that the pressure of spring 36 is partly relieved, and valve member 35 opens valve seat 37 to permit more air to escape from chamber 34 through opening 38. Since a greater amount of air escapes through outlet conduit 32 from cylinder chamber 30 than can be replaced through conduit 31, the pressure in the cylinder chamber 30 drops, the air pressure in conduit 57, 1 acting on the end face of valve member 4, urges the same to a wider open position in which a greater amount of air is blown-off through opening 2a.

When due to other operational conditions, such as a greater load, the control means turn cam arm 22 is counterclockwise direction, valve 35, 37 closes and the pressure in cylinder chamber 30 is increased so that valve member 4, 5 closes valve seat 3 and no air can escape from conduit 57, 1 out of opening 2a. Consequently, more air is supplied to the combustion engine until the control means open valve 35, 37, and permit air to escape from cylinder chamber 30 so that valve 4 can return to an open position.

It is also possible to design the control valve means 35 to 38 and the control means 22 to 26, 100 so that valve 35, 37 is normally closed and opens only when the control means respond to a drop of the load on the engine.

The embodiments of FIGS. 1 and 2 have been described to have blow-off valve means 3, 4, 2a which are partly open under normal operational conditions of the combustion engine. However, it is also possible to have valve means 3, 4 closed during normal operation when the combustion engine operates at a normal load so that its output shaft rotates at a normal desired number of revolutions. In this event, the control means 22 to 26, 100 effect opening of the valve and blowing-off of air from conduit 57 only when the load on the engine suddenly drops so that the engine requires a lesser amount of air to be mixed with fuel gas. When the load is increased, valve means 3, 4 remains closed and the amount of air charged into the engine is not varied. An adjustment of the air-fuel ratio does not take place in this construction when the load is charged.

Referring now to the embodiment of FIG. 3, portion 1 of air conduit 57 has a pipe socket 1a to which a pipe portion 2' with a transverse wall having a valve seat 3 is secured. A housing 70 forming a cylinder for a piston shaped slide 6' is secured to pipe portion 2' and has a blow-off opening 71. A valve member 4 cooperates with valve seat 3 and has a valve stem 5 secured to the piston slide 6'. Valve stem 5 has a thicker portion 42 with a dished abutment member 41 on which a spring 39 abuts. The other end of spring 39 abuts a control piston 45 slidable in a control cylinder 72 and forming chambers 46, 49 in the same. Another spring 40 abuts the top face of piston 45 and an end plate 73 which has an opening connected by a pipe 48 with the mixer valve means 60 shown in FIG. 4. The lower chamber 46 has an opening 47 communicating with the atmosphere.

A conduit 31' connects air conduit 57 with the upper chamber 44 so that the pressure in chamber 44 acts on piston slide 6' to move valve 4 downward into engagement with valve seat 3, and such movement is opposed by the pressure of the air of air conduit 57 acting on the end face of valve member 4 when the same is closed during operation of the combustion engine 50 under normal operational conditions. When the load on the engine is reduced, the pressure in control chamber 49 is substantially reduced since the butterfly valve 61 of the mixer valve 60 is almost closed so that the pressure in the mixing chamber of mixer valve 60 is far below the normal atmospheric pressure. The atmospheric pressure in the lower chamber 46 having opening 47 moves control piston 45 upward so that spring 40 is compressed, while spring 39 is relieved. The pressure on the stem 42, 5 of valve member 4 is reduced, and only the pressure in chamber 44 corresponding to the pressure of air conduit 57 acts on valve member 4. This pressure is reduced due to the throttle effect of conduit 31', and consequently the pressure acting upward on valve member 4 is sufficient to raise and open the same so that air is blown-off through opening 71 until a condition of equilibrium is again established.

The general arrangement of the combustion engine and of the exhaust-driven blower is known, and for example described in the U.S. Patents 2,559,623 and 1,682,866. Combustion engine 50 is preferably a four stroke Otto gas motor, using city gas, natural gas having 80% methane, or propane gas.

Governor 100 which responds to the number of revolutions of the output shaft of the engine 50 is either directly connected with connecting wire 26 and cam portion 22 in the embodiment of FIGS. 1 and 2, or by means of a power amplifying device of standard construction which is, for example, manufactured by Curtis Wright.

It will be understood that each of the elements described above, or two or more together, may also find a useful application in other types of control systems for combustion engines differing from the types described above.

While the invention has been illustrated and described as embodied in an air-fuel ratio control system using a valve for blowing-off air not required by operational conditions, it is not intended to be limited to the details shown, since various modifications and structural changes may be made without departing in any way from the spirit of the present invention.

What is claimed as new and desired to be secured by Letters Patent is:

1. Air-fuel ratio control system comprising, in combination, an Otto combustion engine having an exhaust conduit; fuel supply means connected with said engine; blower means including an air conduit connected with said engine for supplying pressure air to the same; a turbine in said exhaust conduit for driving said blower means; blow-off valve means connected with said air conduit and including a movable valve member having a normal position and a blow-off position, and being biased by the pressure in said air conduit to move from said normal position to said blow-off position; mechanical linkage means connected to said blow-off valve means; and control means connected also to said mechanical linkage means so as to be connected by the same with said blow-off valve means and including a speed responsive centrifugal governor rotated by said engine and responsive to speed variations of said engine caused by load variations, and fluid operated servo motor means including a piston operatively connected with said valve member and a control valve operated by said governor so as to hold said valve member in said normal position during operations of said engine at normal load, and being responsive to varying speeds of said engine and thereby to load variations to control movement of said blow-off valve means to said blow-off position whereby the amount of air charged into said engine is varied with the speed and load of said engine so as to maintain the fuel-air ratio substantially constant.

2. A control system according to claim 1 wherein said blow-off valve means is partly open in said normal position, and wider open in said blow-off position, and has a closed position; and wherein said control means responds to a change of the operational conditions of the combustion engine to move said blow-off valve means from said normal partly open position either to said wider open blow-off position or to said closed position for varying the fuel-air ratio.

3. A control system according to claim 1 and comprising spring means for connecting said piston with said movable valve member of said blow-off valve means whereby said valve member is moved between said positions thereof under the control of said governor through said servo motor.

4. Air-fuel ratio control system comprising, in combination, an Otto combustion engine having a mixer valve, said mixer valve having a movable valve member controlling the flow of the air-fuel mixture; fuel supply means connected with said mixer valve; blower means including an air conduit connected with said mixer valve for supplying air under pressure to the same; blow-off valve means connected with said air conduit and having a normal position and a blow-off position, and being biased by the pressure in said air conduit to move from said normal position to said blow-off position; and control means for said blow-off valve means responsive to variations of the operational conditions of said combustion engine caused by load variations to hold said blow-off valve means in said normal position during normal operation of said combustion engine, and being responsive to varying operational conditions of said combustion engine upon load variations to cause movement of said blow-off valve means to said blow-off position whereby the amount of air charged through said mixer valve into said engine is varied in accordance with the prevailing operational condition of the combustion engine so as to maintain the fuel-air ratio substantially constant, said control means including a pneumatic servo motor having a movable member connected with said blow-off valve means and working chambers connected with said air conduit and with said mixer valve so that said blow-off valve means is controlled in accordance with the pressure in said mixer valve.

5. Air-fuel ratio control system comprising, in combination, an Otto combustion engine having a mixer valve; fuel supply means connected with said mixer valve; blower means including an air conduit connected with said mixer valve for supplying air under pressure to the same; blow-off valve means connected with said air conduit and having a normal position and a blow-off position, and being biased by the pressure in said air conduit to move from said normal position to said blow-off position, said blow-off valve means including a valve seat and a valve member cooperating with said valve seat in said positions and being spaced from the same in said blow-off position, said blow-off valve means having an opening for discharging air in said open position of said valve member; and control means for said blow-off valve means responsive to variations of the operational conditions of said combustion engine caused by load variations to hold said blow-off valve means in said normal position during normal operation of said combustion engine, and being responsive to varying operational conditions of said combustion engine upon load variations to cause movement of said blow-off valve means to said blow-off position whereby the amount of air charged through said mixer valve into said engine is varied in accordance with the prevailing operational condition of the combustion engine so as to maintain the fuel-air ratio substantially constant, said control means including a governor responsive to speed variations of said combustion engine, and a servo motor connected with said blow-off valve means for operating the same, and being controlled by said governor, said servo motor including a cylinder chamber, and a piston slide in said cylinder chamber connected with said valve member for moving the same between said positions thereof, a spring in said cylinder chamber acting on said piston slide to move said valve member toward said valve seat against the pressure of the air in said air conduit, and a conduit connecting said air conduit with said cylinder chamber to produce pressure in the same cooperating with said spring to move said movable valve member toward said valve seat; said control means including control valve means including a casing with a discharge opening and a movable member controlled from said governor to move between open and closed positions and a conduit having a larger cross-section than said first-mentioned conduit connecting said cylinder chamber with said casing of said control valve means so that opening of said control valve means under the control of said governor causes discharge of air from said cylinder chamber through said discharge opening in said control valve whereby the pressure in said cylinder chamber is reduced, and the pressure acting on said valve member of said blow-off valve means operates said valve member to permit the blowing-off of air from said air conduit.

References Cited

UNITED STATES PATENTS

| | | | |
|---|---|---|---|
| 3,173,242 | 3/1965 | Erickson | 60—13 |
| 1,346,124 | 7/1920 | Guerrlich. | |
| 1,543,680 | 6/1925 | Redfield | 230—29 |
| 1,955,799 | 4/1934 | Fielden. | |
| 1,984,013 | 12/1934 | Fast. | |
| 2,500,234 | 3/1950 | Bates. | |
| 2,660,991 | 12/1953 | Wasielewski | 230—29 |
| 2,732,125 | 1/1956 | Ruby | 60—39.29 |

FOREIGN PATENTS 519,806  4/1940  Great Britain.

JULIUS E. WEST, *Primary Examiner.*

DOUGLAS HART, *Assistant Examiner.*

U.S. Cl. X.R.

23—119; 230—29